US008700253B2

(12) United States Patent
Fischer

(10) Patent No.: US 8,700,253 B2
(45) Date of Patent: Apr. 15, 2014

(54) SYSTEM AND METHOD FOR COLLECTING DEFECT DATA OF COMPONENTS IN A PASSENGER CABIN OF A VEHICLE

(75) Inventor: Daniel Fischer, Buchholz (DE)

(73) Assignee: Airbus Operations GmbH, Hamburg (DE)

( * ) Notice: Subject to any disclaimer, the term of this patent is extended or adjusted under 35 U.S.C. 154(b) by 197 days.

(21) Appl. No.: 13/218,254

(22) Filed: Aug. 25, 2011

(65) Prior Publication Data

US 2012/0053779 A1    Mar. 1, 2012

Related U.S. Application Data

(60) Provisional application No. 61/377,016, filed on Aug. 25, 2010.

(30) Foreign Application Priority Data

Aug. 25, 2010  (DE) .......................... 10 2010 035 374

(51) Int. Cl.
*G01M 17/00*    (2006.01)

(52) U.S. Cl.
USPC ....... 701/29.6; 700/283; 705/14.38; 707/758; 711/104; 714/31; 714/49; 725/105; 414/627; 365/189.16; 365/201; 477/97; 606/41; 348/143; 52/7; 370/242; 455/456.2; 379/219; 345/55; 342/357.3; 340/8.1

(58) Field of Classification Search
USPC .......... 700/283; 705/14.38; 707/758; 714/31, 714/49; 725/105; 414/627; 365/189.16, 365/201; 477/97; 606/41; 348/143; 52/7; 370/242; 455/456.2; 379/219; 345/55; 342/357.3; 340/8.1
See application file for complete search history.

(56) References Cited

U.S. PATENT DOCUMENTS 4,135,630 A * 1/1979 Snyder et al. ................. 414/627
5,991,207 A * 11/1999 Sedlak et al. ............ 365/189.16

(Continued)

FOREIGN PATENT DOCUMENTS

DE    19822392 A1    12/1999
EP    1280316 A2    1/2003

(Continued)

OTHER PUBLICATIONS

European Patent Office, European Search Report for European Patent Application No. 11178633.1, dated Feb. 3, 2012.

(Continued)

*Primary Examiner* — Muhammad Shafi
*Assistant Examiner* — Sanjeev Malhotra
(74) *Attorney, Agent, or Firm* — Ingrassia Fisher & Lorenz P.C.

(57) ABSTRACT

A system is provided for collecting defect data of components in a passenger cabin of a vehicle that includes, but is not limited to a component identification device for identifying an affected component, and a malfunction selection device, connected to the component identification device, for selecting a malfunction of the identified component from a predefined quantity of component-specific malfunctions. The system includes, but is not limited to a locating device for acquiring a position of the affected component in the passenger cabin, with the aforesaid being connected to the component identification device. In this manner, by means of devices that are very simple to use, imprecise positioning information, component information and malfunction information can be avoided.

12 Claims, 4 Drawing Sheets

(56) References Cited

U.S. PATENT DOCUMENTS

| | | | |
|---|---|---|---|
| 6,139,468 A * | 10/2000 | Goates et al. | 477/97 |
| 6,816,762 B2 | 11/2004 | Hensey et al. | |
| 8,400,268 B1 * | 3/2013 | Malik et al. | 340/8.1 |
| 2001/0034567 A1 * | 10/2001 | Allen et al. | 700/283 |
| 2003/0036757 A1 * | 2/2003 | Novak et al. | 606/41 |
| 2003/0149833 A1 * | 8/2003 | Hamlin | 711/104 |
| 2004/0008253 A1 * | 1/2004 | Monroe | 348/143 |
| 2004/0128918 A1 * | 7/2004 | Yang et al. | 52/7 |
| 2005/0040224 A1 | 2/2005 | Brinton et al. | |
| 2005/0193257 A1 * | 9/2005 | Stoler | 714/31 |
| 2006/0221735 A1 * | 10/2006 | Matsumoto | 365/201 |
| 2006/0235611 A1 | 10/2006 | Deaton et al. | |
| 2007/0097871 A1 * | 5/2007 | Boyd et al. | 370/242 |
| 2007/0130599 A1 * | 6/2007 | Monroe | 725/105 |
| 2007/0167173 A1 * | 7/2007 | Halcrow et al. | 455/456.2 |
| 2007/0211878 A1 * | 9/2007 | Cadiz et al. | 379/219 |
| 2008/0270853 A1 * | 10/2008 | Chagoly et al. | 714/49 |
| 2008/0284679 A1 * | 11/2008 | Ishizuka | 345/55 |
| 2009/0237245 A1 | 9/2009 | Brinton et al. | |
| 2010/0153419 A1 * | 6/2010 | Daum et al. | 707/758 |
| 2011/0246284 A1 * | 10/2011 | Chaikin et al. | 705/14.38 |
| 2011/0254729 A1 * | 10/2011 | Dutta et al. | 342/357.3 |

FOREIGN PATENT DOCUMENTS

| | | |
|---|---|---|
| EP | 1860572 A1 | 11/2007 |
| FR | 2939220 A1 | 6/2010 |
| WO | 0052550 A2 | 9/2000 |
| WO | 2010122048 A1 | 10/2010 |

OTHER PUBLICATIONS

European Partial Search Report dated Oct. 20, 2011 for Application No. 11178633.1.

German Office Action for German Application No. 102010035374.4 dated Jun. 8, 2011.

* cited by examiner

SYSTEM AND METHOD FOR COLLECTING DEFECT DATA OF COMPONENTS IN A PASSENGER CABIN OF A VEHICLE

CROSS-REFERENCE TO RELATED APPLICATIONS

This application claims the benefit of the filing date of German Patent Application No. 10 2010 035 374.4 filed Aug. 25, 2010 and of U.S. Provisional Patent Application No. 61/377,016 filed Aug. 25, 2010, the disclosures of these applications are hereby incorporated herein by reference.

TECHNICAL FIELD

The technical field relates to a system for collecting defect data of components in a passenger cabin of a vehicle with a component identification device for identifying an affected component, and a malfunction selection device, connected to the component identification device, for selecting a malfunction of the identified component from a predefined quantity of component-specific malfunctions. The technical field also relates to a method for collecting defect data of components in a passenger cabin of a vehicle and to a vehicle with a passenger cabin and a system, installed in the vehicle, for collecting defect data of components in the passenger cabin.

BACKGROUND

In vehicles used for the commercial transport of passengers, where the cabin outfit is to be considered a strong competitive characteristic, it is absolutely essential to detect defective components in the passenger cabin and to precisely collect defect data in a central location in order to make it possible to affect repair as soon as possible to rectify the defect. The classical method of collecting such defect data in passenger cabins involves carrying a paper-based logbook into which the persons accompanying the vehicle enter defect data which they either have noticed themselves or which was communicated to them by individual passengers. This approach can be associated with problems in that between learning of a defect of a component and the final entry in the logbook some time might pass, for example if the particular person accompanying the vehicle is engaged in serving passengers or is collecting empty food containers and waste, and during these activities is informed about a defect. Having received such a defect message the person accompanying the vehicle cannot immediately interrupt their work in order to make an entry in the logbook, but instead will first complete their activity and then log the defect. In the meantime it can happen that the person accompanying the vehicle forgets to make an entry, or that their recollection of the defect is only vague so that the corresponding logbook entry is not entirely correct.

EP 1 280 316 A2 shows an electronic variant of a logbook in which various users with different security levels can make dialog-guided entries of defect data by means of a mobile data collection device, in which affected components and their malfunctions can be selected. In this process at the same time the authorization of the respective user is verified. Furthermore, maintenance data generated from this is transmitted to mobile electronics devices for use during a maintenance procedure.

Collecting defect data of components in a passenger cabin of a vehicle, be it in a manual or electronic manner, while providing the possibility of collecting defect data at a central location and of conveying said data at a later stage to a maintenance system, nevertheless is associated with a degree of uncertainty relating to the precision of the acquired defect data.

It is at least one object to propose a system for collecting defect data of components in a passenger cabin of a vehicle, in which system the highest possible precision is achieved with regard to the defective component, the location of the defective component and the fault of the defective component. It is at least a further object to propose such a system which involves the smallest possible manual effort by a person accompanying the vehicle or by a passenger. In addition, other objects, desirable features and characteristics will become apparent from the subsequent summary and detailed description, and the appended claims, taken in conjunction with the accompanying drawings and this background.

SUMMARY

According to an embodiment, the system may comprise a component identification device for identifying an affected component, preferably from a predefined overall quantity of components in the passenger cabin, and a malfunction selection device, which is connected to the component identification device, for selecting a malfunction of the identified component from a predefined quantity of component-specific malfunctions. This is supplemented by a locating device that can acquire the position of an affected component in the passenger cabin, and with the acquired position by its connection to a component identification device triggers identification of the component at the acquired position. It is at least one objective of this design to engage in locating the affected component directly at the time of acquiring defect data, instead of having to note the details of the defective component, having to fall back on imprecise information supplied by a passenger, or taking over a reading error in determining an associated seat or the like. There is thus an advantage in that identification of the affected component only takes place after locating, and thus can exclude human error.

The locating device is equipped to determine with sufficient accuracy a position of a component in the three-dimensional space delimited by the walls of the passenger cabin. In the state of the art a multitude of locating systems exist which can be designed in various ways. It seems practicable for this locating device to comprise a series of base stations, arranged in the passenger cabin so as to be fixed and spaced apart from each other, which base stations are adapted to be able to determine the position of a pointing device. In this arrangement the locating device can, for example, fall back to measuring transit time differences of signals that are exchanged between the individual base stations and the pointing device, in order in this manner to determine relative positions to the individual base stations, which relative positions can finally be correlated to a three-dimensional position within the passenger cabin. The transit time differences may relate to the propagation of electromagnetic waves or, for example, of ultrasonic waves.

The component identification device is connected to the locating device and can, for example from a component database with component identification data and associated three-dimensional positions, from an incoming position identify a component or a component group at the acquired position. Any error relating to the component concerned can thus be excluded with adequate precision, because any knowledge relating to the seat row, seat number or the like is obsolete, and the locating device itself can convey the precise position to the component identification device. From the list of identified components in question (device list) the user can select the component concerned and can transmit the component identification to the malfunction selection device.

By means of identification of the component the malfunction selection device cannot automatically detect the presence of a malfunction. However, since usually in relation to each component concerned only a limited number of malfunctions are possible, they may be filtered out, from a malfunction database or an internal storage unit, by means of the malfunction selection device for a selection dialog. The malfunction selection device preferably comprises a collection of known malfunctions that may be detected at an identified component. The malfunction selection device thus makes it possible to list on a display unit all imaginable malfunctions, from which malfunctions a user can select the actually determined malfunction. This is associated with a particular advantage in that free-text information relating to an existing malfunction can be done without, which free-text information only rarely describes a malfunction with adequate precision. Restricting the choice of malfunctions furthermore facilitates the transmission of defect data to a maintenance system, because the maintenance system then only needs to generate maintenance notes from a complete quantity of possible malfunctions, without having to interpret free-text information or the like.

In an embodiment, the system comprises a pointing device for marking a respective component for the locating device. The pointing device can be designed in such a manner that to the locating device it represents an unequivocal passive object that is located within the passenger cabin and visually or based on other physical characteristics cannot be mistaken for other objects or components. On the other hand, the pointing device can also be designed as an active component that emits a locating signal which can be evaluated by base stations arranged so as to be affixed in the passenger cabin. The scope of protection is not limited to particular locating devices or pointing devices, and for this reason in this context, only as examples, various types of pointing devices are mentioned. A pointing device may, for example, emit an electromagnetic or acoustic signal which can be received by components of the locating device. From the determination of transit time differences of this signal at the various base stations, the relative position of the pointing device can be determined unequivocally by the individual base stations of the locating device. The pointing device may, furthermore, comprise visually conspicuous coloration or some other characteristics that can be recognized by suitable components of a locating device. However, this requires, for example, the arrangement of base stations, cameras or the like in adequate numbers within the passenger cabin so that the pointing device can be seen by the greatest possible number of such components of the locating device, even if said pointing device is visually covered to one or several sides of the passenger cabin.

In another embodiment, the component identification device is designed, by means of the acquired position of the affected component, from a component database comprising component identification data and positioning data of components to filter a component group comprising one or several components of the passenger cabin for a selection dialog, with the aforesaid being located in close proximity to the acquired position of the affected component. If the component concerned is a rather small component or if the component cannot be unequivocally marked, without adjacent components also being touched or covered by the pointing device, it makes sense to make it possible to also identify adjacent components in the form of a component group, in order to later on exclude possible faults or to always carry out a new position determination until the correct component has been identified. However, depending on the locating technology applied, the achievable positioning accuracy can be in a range of approximately +/−10 cm, and consequently for this reason, too, it is recommended to straight away identify a component group with adjacent components. By way of a simple selection dialog it is possible to quickly and in an uncomplicated manner select among the adjacent components.

In another embodiment, the malfunction selection device is adapted to filter possible malfunctions, which relate to a selected component from a malfunction database comprising a predefined quantity of possible malfunctions, for a selection dialog. A selection dialog on a suitable device that is connected to the malfunction selection device can thus quickly lead to a more precise determination of the present malfunction.

In another embodiment the component identification device and the malfunction selection device are connected to an electronics device. The electronics device comprises a display unit and is adapted to display a selection dialog, and further comprises an input unit by means of which a user can interact with the selection dialog. As set out above, a particular characteristic of the system according to the invention relates to the provision of a group of components in question, and, after selection of the component concerned, to the provision of a limited quantity of predefined malfunctions, in order to obtain as precisely as possible a malfunction description relating to an identified component. By means of the input device, the user can navigate through the selection dialog by means of a user interface, which is preferably a graphic user interface, which apart from text information can also comprise images of components.

In another embodiment the electronics device is equipped to transmit component identification data and malfunction data to a storage unit which is preferably a digital logbook or a component of a digital logbook in the form of a central defect database. In this manner, identified malfunctions can be stored, in a manner identical to that of a paper-based logbook, in a single location from where they can later in an automated manner be transmitted to a maintenance system.

In another embodiment the component identification device comprises a component database in which the three-dimensional positions of all the components in the passenger cabin of the aircraft have been correlated with component identification data. This makes it possible, at a later point in time, to draw conclusions relating to the respective component after locating the respective component has taken place. In this arrangement, component identification data can be present in whatever form, for example as a parts number that can be supplemented by a precise seat position or the like. In addition to this, the incorporation of clear text information is also imaginable, which may be helpful to indicate incorrect component identification. The database may be treated like a read-out table. It is not absolutely necessary for the evaluation table to be two-dimensional; it can also be implemented so as to be three-dimensional, wherein, in a specified two-dimensional or three-dimensional grid, positions with component identification data are contained as data points so that in the presence of a three-dimensional position it is easily possible to read out matching component identification data.

All the above-mentioned databases, such as the defect database, the malfunction database, the component database or the like, and the component identification device and the malfunction selection device need not necessarily be implemented by means of various electronic devices or arithmetic units; instead, it generally makes sense to use a sole arithmetic unit with one or several database applications that comprises/comprise several data records, databases or tables, and can correlate positions with component identification data.

Integration of the various components by means of a single arithmetic unit would reduce the complexity of the system, as well as the weight and the integration expenditure. In terms of improved reliability, the usual measures for increasing the reliability of electronic systems may be used, wherein it should, however, be taken into account that such a system for collecting or acquiring defect data is not adapted to support mission-critical functions.

In another embodiment the electronics device may be designed as a mobile arithmetic unit, for example in the form of a PDA, of a mobile PC or of some other mobile electronic device. In this arrangement it should be ensured that this electronics device comprises a data connection device by means of which necessary component identification data and malfunction data can be transmitted. As an alternative to this it is also imaginable that all the data required for the function are contained in this mobile arithmetic unit, and can regularly be updated by means of a corresponding data connection or data carrier, in particular following the exchange of one or several components in the passenger cabin.

In another embodiment, the electronics device comprises a pointing device for spatially marking the affected component. In this manner the electronics device can be used as the sole compact unit for determining and acquiring a malfunction without there being a need to fall back to an external, additional, pointing device.

In another embodiment it makes sense to equip the electronics device with a reading device for transponders, which reading device, in addition to the electronic three-dimensional position determination, makes it possible to read out transponder information of adjacent components so that component identification can additionally be improved. Generally speaking, the transponders can be so-called RFID tags which when excited by an external electromagnetic field are made to transmit a characteristic data record, which, for example, comprises component identification data. If the electronics device is held in close proximity to a number of components and if locating is carried out in that area, in addition to the electronically determined position, a set of component identification data is obtained by read-out of the transponders, so that the electronics device can check whether the component identifying device of the system according to the invention has failed to identify a component that has, however, transmitted a data record, by means of a transponder, to the electronics device (more complete actual configuration).

In this manner it would no longer be necessary to identify all the components in a current component identification database (cabin layout) but instead, for example, easily reconfigurable (movable) components whose positions in ongoing operation of an aircraft are difficult to keep track of (e.g., life jackets, class dividers, fire extinguishers or the like) may be registered independently of the component identification database by concurrently locating their exact position in the passenger cabin. This information obtained in addition in this manner may also be used in order to update the component identification database in ongoing operation.

Generally speaking, the absolute position coordinates of the defect, as additional information to component identification, provide valuable additional information, because in this way, for maintenance, lastly independently of human inaccuracy or EDP inaccuracy of any report or EDP errors the position of the defect is reconstructed. Likewise, on large-area components the precise positions of defects (e.g., cracks in lining panels, stains on a carpet, etc.) can be found again.

Preferably, the electronics device is a mobile electronics device that comprises a data connection device for communicating with the locating device, wherein the data connection device comprises, in particular, wireless data connection devices so that the electronics device can be used universally and within the entire passenger cabin for acquiring defect data.

The component identification device, the malfunction selection device and optionally also the databases necessary for this purpose are integrated in the mobile electronics device. Likewise it may make sense to equip the mobile electronics device with a data connection device so that it can communicate with an externally provided component identification device and/or a malfunction selection device for processing selection dialogs, if these components of the system are not to be integrated in the electronics device.

In another embodiment the pointing device can be designed as a visual pointing device that comprises a distance meter. Instead of using, for example, a housing edge of a pointing device, accordingly the user may visually mark the desired component or its position already from a certain distance, for example by means of a laser beam. In order to determine the correct position of the marking point the pointing device should comprise an additional position sensor in order to determine the spatial orientation relative to the locating device. The position of the pointing device, to which vectorally the orientation of the pointing device as well as the connecting line between the pointing device and the marking point would have to be added, would then result in the precise position of the component to be selected. In this manner it would be possible, for example in passenger cabins with a tight seating arrangement, to avoid having to inconvenience passengers when the respective component, while visible, nevertheless is not easily reachable by a person accompanying the vehicle, without, for example, passengers having to get out of their seats or the like.

A method is also provided for collecting defect data of components in a passenger cabin of a vehicle with the characteristics of the further independent claim. Advantageous improvements are set out in the following subordinate claims. The method in principle first involves the method-related steps stated below, which steps make it possible to achieve improved collection of defect data of components. After a defect of a component has been determined, the respective component is located by means of the locating device, which transmits details of the marked position of the component to a component identifying device, where from the three-dimensional position of the respective component its identification is carried out. This may, for example, take place by means of reading out from a table that is present in a two-dimensional or three-dimensional form, in which table positions within the passenger cabin are correlated with component identification data. If identification of the component has been successful, the malfunction selection device retrieves all the imaginable malfunctions of the identified component from a database, from a storage device or the like, and presents the possible malfunctions to a user. After selection of the applicable malfunction, said malfunction is finally saved, together with the component identification data, in a defect database. In this manner it is possible precisely, unequivocally and without any doubt to convey the present defect to a defect database, without manual inputs, free-text information, incorrect information or a faded human recollection being able to falsify the present malfunction.

An aircraft is provided with at least one passenger cabin that is equipped with a system. In particular in large modern commercial aircraft with a three-digit number of passenger seats, the presently very high level of furnishing and fittings, and corresponding passenger comfort, a multitude of different components exist, with completely different possible malfunctions, so that cabin crew need to record extremely precisely any defects they have noticed, so that timely repair or maintenance can be ensured. The system very clearly facilitates this because the cabin crew need not be preoccupied with exact positioning of the component, its designation, and the possible malfunctions, and as a result of the limited choice of possible malfunctions without the necessity of providing free text information, in a very short time extremely precise information relating to the defect detected becomes possible. This further enhances the comfort provided on board the aircraft, because it is possible, for example with a connection to a maintenance system, to ensure that the comfort on all seats can be maintained at all times.

BRIEF DESCRIPTION OF THE DRAWINGS

Further characteristics, advantages and application options of the present invention are disclosed in the following description of the exemplary embodiments and of the figures. All the described and/or illustrated characteristics per se and in any combination form the subject of the invention, even irrespective of their composition in individual claims or their interrelationships. Furthermore, identical or similar objects in the figures have the same reference characters, where:

DETAILED DESCRIPTION

Figure 1:
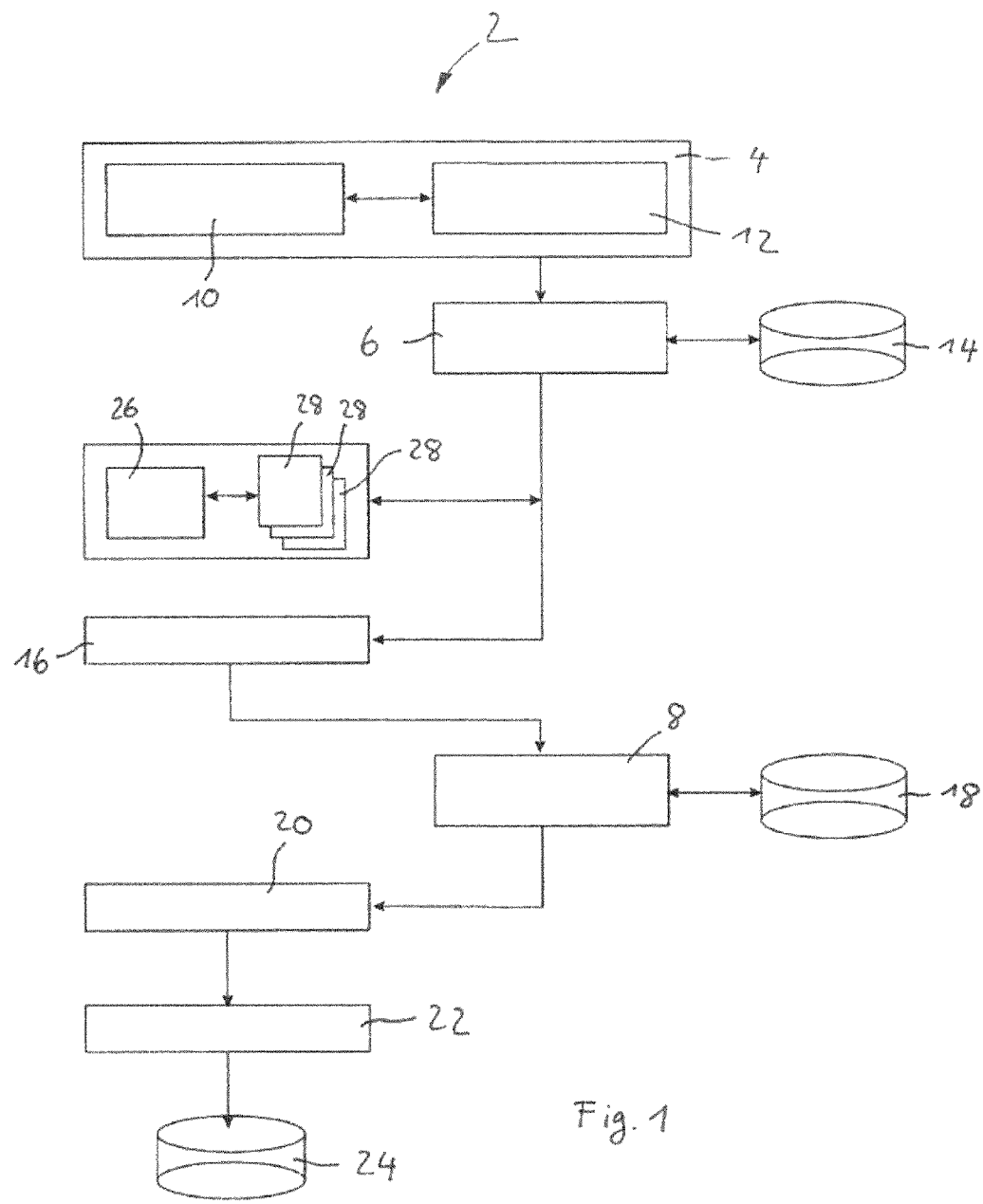
FIG. 1 shows a diagrammatic view of the system according to an embodiment of the invention.

FIG. 1 shows the system 2, which comprises a locating device 4, a component identification device 6 and a malfunction selection device 8. The locating device 4 is in contact with a pointing device 10 in order to determine the position of the pointing device 10 within the cabin. Locating can, for example, be based on measuring transit time differences of electromagnetic or acoustic waves that are transmitted by the pointing device to several base stations 12 or other counterparts within the passenger cabin. For the precise determination of a spatial position, preferably four or more base stations 12 or receiving devices are to be affixed in the passenger cabin at defined locations. In the state of the art there are a multitude of different locating devices, wherein the embodiments of the invention is not limited to the selection of these.

By determining the three-dimensional position of the pointing device 10 within the passenger cabin, the system 2 is able, by means of the component identifying device 6, to identify components situated in proximity to the pointing device 10. To this effect, the component identifying device consults, for example, a component identification database 14 in which spatial positions of components are correlated in tabular form with component identification data. If a three-dimensional position is available, by means of it the components in question can be identified and can be presented to a user for selection, for example by means of a graphic user interface 16.

After selection of the respective component 36 that comprises a determined defect, by means of the malfunction selection device 8, for example by consulting a malfunction database 18, a predefined quantity of malfunctions in question can be compiled and presented to a user for selection, for example by means of a further graphic user interface 20.

After selection of the applicable malfunction, a data record is thus present that comprises precise component identification data and precise malfunction data, which data record can be conveyed to a logbook application 22. The logbook application 22 may be in communication with a defect database or logbook database 24 or with some other storage unit in which centrally all the malfunctions or other defect data present within the passenger cabin is stored, which can then unequivocally be conveyed to a maintenance system for generating maintenance notes or maintenance schedules.

The component identifying device 6, the malfunction selection device 8 and the logbook application 22 need not necessarily be designed as independent hardware-based devices; instead, they can also be installed, in the form of application programs, on a stationary or on a mobile device which by way of a suitable data connection can communicate at least with the locating device 4. With the present technical development of mobile devices, for example PDAs, the component identification database 14 and the malfunction database 18 can without any problems be designed so as to be storable and executable in a mobile manner.

The pointing device 10 also need not necessarily be designed as a separate device, instead it may be executed in the form of an application in combination with a suitable electronics component for emitting electromagnetic or acoustic waves on the mobile device, so that all the components shown in FIG. 1, except for the base stations 12 of the locating device 4, can be stored within a single mobile device.

Identification of a component or of a component group can additionally be improved by the use of a reading device 26 for transponders 28, for example RFID tags. In particular in the case of small components which are arranged in association with other small components, and consequently unequivocal locating by means of the locating device 4 is made difficult, resorting to the acquisition of transponder data makes sense. In addition to this, when acquiring transponder data it is nevertheless possible to determine the determined position within the cabin in order to store this position together with the transponder data. This facilitates not only maintenance of the database 14 because it is not necessary to acquire all the three-dimensional positions of all the smaller components in the passenger cabin, but also the maintenance tasks, because maintenance personnel can see at a glance where the defective component is located within the cabin.

Figure 2:
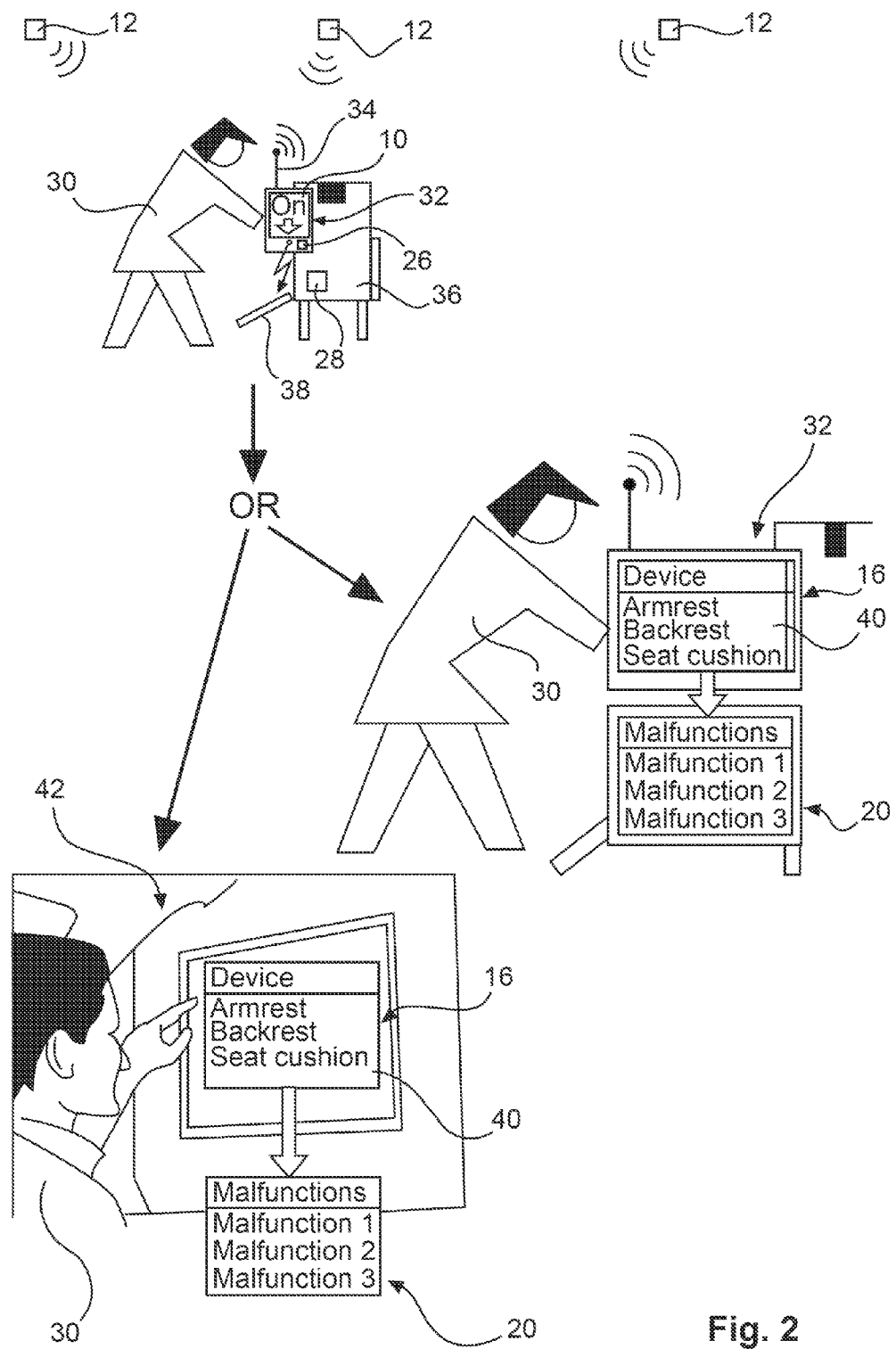
FIG. 2 shows a diagrammatic view of the sequence of marking and selecting a device and a malfunction.

FIG. 2 provides a more detailed view of the various embodiments. A person 30 accompanying the vehicle operates a pointing device 32 which is designed in the form of a PDA comprising an electronics component with an antenna 34 for emitting electromagnetic waves for locating and/or for data transmission. The person 30 accompanying the vehicle holds the pointing device 32 to a component 36 and by activating an input means triggers a locating action so that, for example, transit time differences between the pointing device 32 and base stations 12 within the passenger cabin can be determined and correlated with positioning data of the base stations 12. Locating can also be referred to as "marking a defective device". Since the component 36 shown is a passenger seat that comprises a host of different independent components, due to the position determined, identification of the respective component 38, a defective armrest, cannot be carried out entirely unequivocally. For this reason the component identifying device 6 is preferably adapted to present all the components in direct proximity to the pointing device 32 on a display unit 40 on which the graphic user interface 16 of FIG. 1 is shown, from which components the respective component 38 can then be selected. The display unit 40 may be designed either in a stationary manner in the form of a cabin panel or a panel 42 for persons accompanying the vehicle, or it may be integrated in the pointing device 32, as shown in FIG. 2 further to the right. In addition, by means of a reading device 26 for transponders 28, which reading device 26 is integrated in the pointing device 32, a transponder data record can be read that identifies the component 36 as being a passenger seat.

After selection of the defective component the present malfunction can be selected, also by means of a graphic user interface 20. In order to simplify the entry of defect data in the logbook application 22, such as a digital logbook, it may be sensible to mount a mobile device within the passenger cabin at a central location, which device when defects become known is taken from its mounting and is held near the respective component. This would correspond to the illustration in FIG. 2, wherein integration of the component identifying device 6, of the malfunction selection device 8 and of the pointing device 32 within this mobile device is to be preferred in larger vehicles, because a single pointing device 32 for locating a component, and subsequent working through selection dialogs at a cabin panel 42 may not necessarily be practicable.

Figure 3:
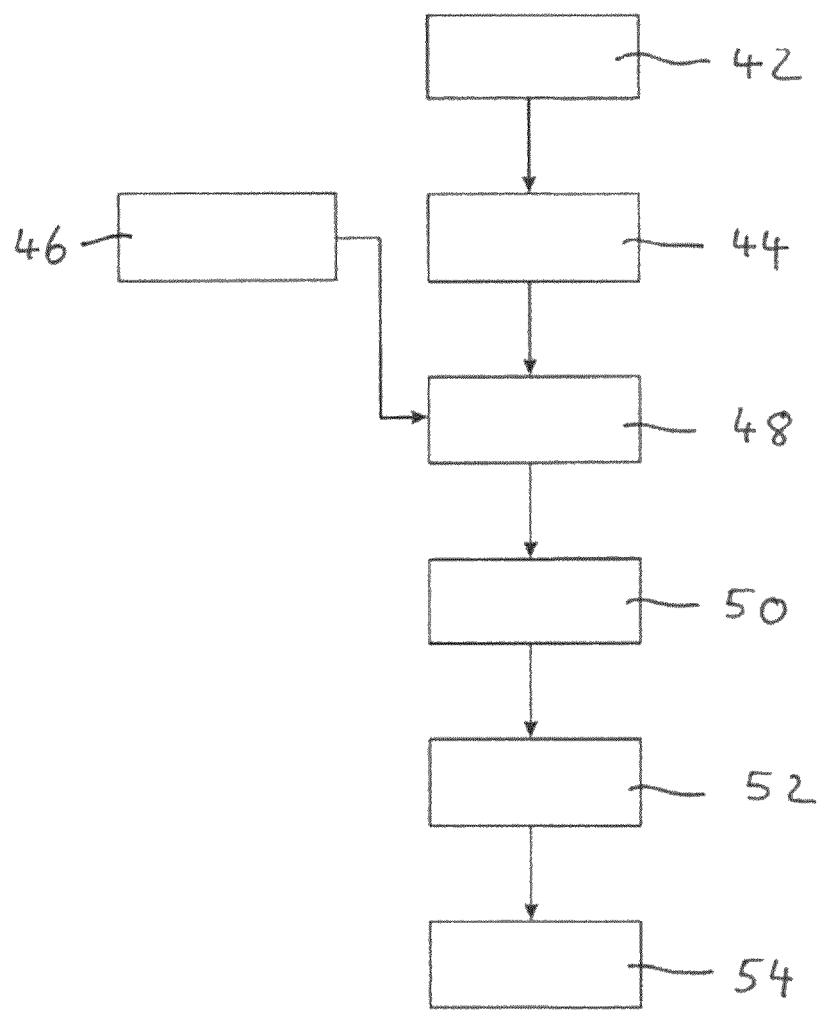
FIG. 3 shows a diagrammatic block-based view of the method according to an embodiment of the invention.

FIG. 3 shows a diagrammatic block-based view of a method according to an embodiment of the invention. The method starts with the step of locating 42 by means of a pointing device, whereupon filtering 44 of components in question is carried out. In addition, reading 46 of transponder data of the respective component can be carried out. After the provision of an interrogation dialog 48 and a corresponding selection by a person accompanying the vehicle, a quantity of malfunctions in question is filtered 50 from a predefined quantity of possible malfunctions, and is made available 52, in the form of a selection dialog, to the person accompanying the vehicle. Thereafter a data record comprising component identification data and malfunction data is conveyed 54 to a central storage unit, which as an example is designed as a defect database 24.

Figure 4:
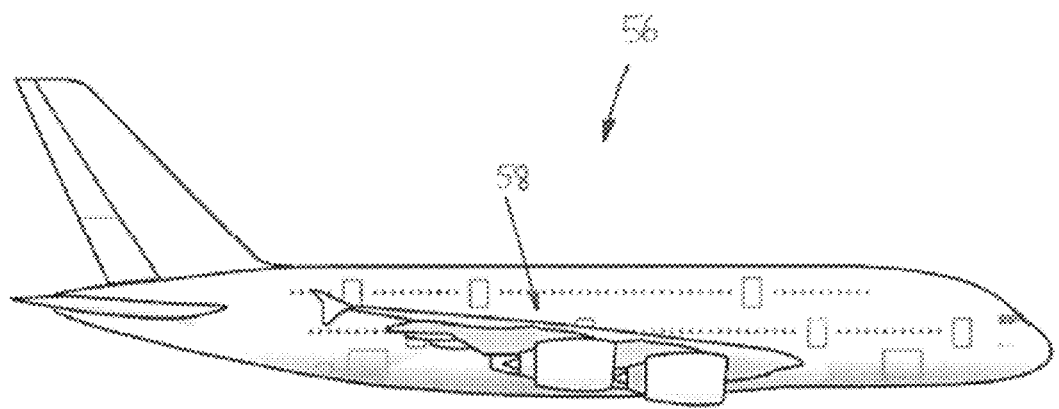
FIG. 4 finally shows an aircraft that comprises a passenger cabin which is equipped with at least one system according to an embodiment of the invention.

FIG. 4 finally shows a commercial aircraft 56 that comprises a passenger cabin 58 which is equipped with a system 2. In particular in the case of larger commercial aircraft with a large number of installed components within the passenger cabin it is recommended to use the system 2 in order to, as precisely as possible and in as error-free a manner as possible, convey malfunction data and component identification data to a digital logbook in order to make it possible to provide prompt maintenance.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments can also be used in combination with other characteristics of other exemplary embodiments described above. Reference characters in the claims are not to be interpreted as limitations. Moreover, while at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment of the invention, it being understood that various changes may be made in the function and arrangement of elements described in an exemplary embodiment without departing from the scope as set forth in the appended claims and their legal equivalents.

What is claimed is:

1. A system for collecting defect data of components in a passenger cabin of a vehicle, comprising:
a component identification device configured to identify an affected component in the passenger cabin;
a malfunction selection device connected to the component identification device, the malfunction selection device configured to select a malfunction of the affected component from a predefined quantity of component-specific malfunctions in a malfunction database; and
a locating device configured to acquire a three-dimensional position of the affected component in the passenger cabin with the locating device connected to the component identification device,
wherein the component identification device identifies the affected component from a component database based on the three-dimensional position acquired by the locating device, and the component identification device, the malfunction selection device, the component database and the malfunction database are at least partially software applications installed on the mobile electronics device and communicate with the locating device.

2. The system of claim 1, further comprising a pointing device configured to mark a respective component for the locating device.

3. The system of claim 1, wherein the component identification device is configured with the position of the affected component from the component database comprising component identification data and positioning data of components to filter a component group comprising a component of the passenger cabin for a selection dialog with the aforesaid located in close proximity to the position of the affected component.

4. The system of claim 3, wherein the malfunction selection device is configured to filter possible malfunctions that relate to a selected component from the malfunction database comprising a predefined quantity of possible malfunctions for the selection dialog.

5. The system of claim 4, further comprising an electronics device that is connected to the component identification device and to the malfunction selection device and that comprises a display unit and an input unit configured to provide the selection dialog that can be operated with the input unit.

6. The system of claim 5, wherein the electronics device is configured to transmit the component identification data and malfunction data of the selected component to a storage unit.

7. The system of claim 5, wherein the electronics device comprises a pointing device that is configured to spatially mark the affected component.

8. The system of claim 5, wherein the electronics device further comprises a transponder-reading device configured to read from transponders of components.

9. The system of claim 5, wherein the electronics device is a mobile electronics device and comprises a data connection device for communicating with the locating device.

10. The system of claim 9, wherein the mobile electronics device is configured to communicate with an externally provided component identification device configured to process selection dialogs.

11. The system of claim 9, wherein the mobile electronics device is configured to communicate with the malfunction selection device that is configured to process selection dialogs.

12. The system of claim 2, wherein the pointing device is a visual pointing device that comprises a distance meter configured to determining a distance between the pointing device and the respective component and a position sensor configured to acquire a spatial orientation of the pointing device.

* * * * *